US012726544B2

(12) United States Patent
Ostrand et al.

(10) Patent No.: US 12,726,544 B2
(45) Date of Patent: Sep. 1, 2026

(54) COORDINATING A CONVERSATIONAL AGENT WITH A LARGE LANGUAGE MODEL FOR CONVERSATION REPAIR

(71) Applicant: International Business Machines Corporation, Armonk, NY (US)

(72) Inventors: Rachel Ostrand, White Plains, NY (US); David John Piorkowski, White Plains, NY (US); John Thomas Richards, Honeoye Falls, NY (US); Steven I. Ross, S Hamilton, MA (US); Yu Tian He, Sammamish, WA (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 18/420,842

(22) Filed: Jan. 24, 2024

(65) Prior Publication Data

US 2025/0240351 A1 Jul. 24, 2025

(51) Int. Cl.
*H04L 67/148* (2022.01)
*G06F 40/20* (2020.01)

(52) U.S. Cl.
CPC ............ *H04L 67/148* (2013.01); *G06F 40/20* (2020.01)

(58) Field of Classification Search
CPC ....... H04L 67/148; G06F 40/20; G06F 40/30; G06F 40/35; G06F 40/279;

(Continued)

(56) References Cited

U.S. PATENT DOCUMENTS 11,436,416 B2 * 9/2022 Beaver .................... G06Q 50/00
11,710,479 B1 * 7/2023 Shenoy ................ G06N 3/0442 704/257

(Continued)

FOREIGN PATENT DOCUMENTS

IN 202341032898 A 6/2023
KR 102551531 B1 7/2023

OTHER PUBLICATIONS

Foosherian, Purwins, Rathnayake, Alam, Teimao, Thoben, “Enhancing Pipeline-Based Conversational Agents with Large Language Models”, arXiv: 2309.03748v1 [cs.CL] Sep. 7, 2023 (Year: 2023).*

(Continued)

*Primary Examiner* — Paras D Shah
*Assistant Examiner* — Nadira Sultana
(74) *Attorney, Agent, or Firm* — Anthony M. Pallone

(57) ABSTRACT

In an approach to coordinating a conversational agent with a large language model for conversation repair, one or more computer processors receive a failure indicator from a first conversational agent. One or more computer processors retrieve a descriptive prompt associated with the first conversational agent. One or more computer processors transmit the descriptive prompt to a large language model. One or more computer processors transfer control of the failed conversation from the first conversational agent to the large language model. One or more computer processors determine the intent of the user associated with the failed conversation using the large language model. One or more computer processors determine whether the intent of the user associated with the failed conversation matches a capability of the first conversational agent. One or more computer processors transfer by one or more computer processors, the user back to the first conversational agent.

17 Claims, 3 Drawing Sheets

(58) Field of Classification Search
CPC ..... G06F 16/3329; G06F 3/015; G06Q 50/00; G10L 15/183; G06N 3/0442; G06N 3/08
See application file for complete search history.

(56) References Cited

U.S. PATENT DOCUMENTS

| | | | | |
|---|---|---|---|---|
| 2020/0382451 | A1* | 12/2020 | Ogawa | G06F 3/015 |
| 2021/0193124 | A1 | 6/2021 | Razin | |
| 2021/0311695 | A1* | 10/2021 | Molina | G06F 3/0484 |
| 2023/0222359 | A1* | 7/2023 | Panikkar | G06N 3/08 706/50 |
| 2023/0259714 | A1 | 8/2023 | Lange | |
| 2024/0282298 | A1* | 8/2024 | Koneru | G10L 15/183 |
| 2024/0303439 | A1* | 9/2024 | Shaikh | G06F 40/30 |
| 2024/0330597 | A1* | 10/2024 | Temraz | G06F 40/35 |
| 2024/0386214 | A1* | 11/2024 | Ghoche | G06F 40/35 |
| 2025/0086394 | A1* | 3/2025 | Reddy | G06F 40/279 |
| 2025/0111192 | A1* | 4/2025 | Bayless | G06F 16/3329 |
| 2025/0174227 | A1* | 5/2025 | Malaviya | G06F 40/30 |
| 2025/0217657 | A1* | 7/2025 | Rank | G06N 3/0895 |

OTHER PUBLICATIONS

Jonathan Pilault, Xavier Garcia, Arthur Brazinskas, Orhan Firat, "Interactive-Chain-Prompting: Ambiguity Resolution for Crosslingual Conditional Generation with Interaction", arXiv:2301.10309v1 [cs. LG] Jan. 24, 2023 (Year: 2023).*

Amer, Meor, "Evaluating LLM Outputs", Cohere, Oct. 2, 2023, 10 Pages.

De Raedt et al., "IDAS: Intent Discovery with Abstractive Summarization", proarXiv:2305. 19783v1 [cs.CL], May 31, 2023, 18 Pages.

Foy, Peter, "Building a Custom GPT-3 Q&A Bot Using Embeddings", MLQ.ai, 2023, 20 Pages.

Gallardo et al., "Fine-tuned LLMs and Distributed Training to elevate your Conversational AI game", Tryo Labs, Jan. 27, 2023, 11 Pages.

Greyling, Cobus, "Bootstrapping A Chatbot With A Large Language Model", Medium, Jun. 30, 2022, 13 Pages.

Greyling, Cobus, "Existing Rigid Chatbot Architecture Needs Large Language Model (LLM) Flexibility", Medium, Feb. 9, 2023, 8 Pages.

Greyling, Cobus, "Zero-Shot Intent Classification via HuggingFace", Medium, Jan. 24, 2023, 7 Pages.

Krush, Israel, Why ChatGPT is a Huge Win for Conversational AI Companies (and Their Customers), Hyro, Dec. 20, 2022, 11 Pages.

Microsoft, "Transition conversations from bot to human", Microsoft Ignite, Oct. 24, 2022, 5 Pages.

Neeley, Brian, "ChatGPT and its implications for customer experience", Biz Crash Business News, Feb. 26, 2023, 6 Pages.

Serrano, Luis, "Three New Modules on LLM University: Semantic Search, Prompt Engineering, and Building With the Cohere Platform", Cohere, Oct. 5, 2023, 3 Pages.

Tijani, Kemi, "Why You Need a Large Language Model for Intent Recognition", Cohere, Jun. 14, 2022, 7 Pages.

Wei et al., "Leveraging Large Language Models to Power Chatbots for Collecting User Self-Reported Data", arXiv:2301.05843v2 [cs. HC], Sep. 22, 2023, 35 Pages.

Yuan, Wei, "Few-Shot User Intent Detection and Response Selection for Conversational Dialogue System using Deep Learning", Thesis, York University, Toronto, Ontario, May 2023, 78 Pages.

Team, Cohere, Tips and Tricks to Build Chatbots With Large Language Models (LLMs), Retrieved from: https://web.archive.org/web/20221123194103/https://txt.cohere.ai/tips-and-tricks-to-build-chatbots-with-large-language-models-llms/, Nov. 23, 2022, 12 pages.

* cited by examiner

COORDINATING A CONVERSATIONAL AGENT WITH A LARGE LANGUAGE MODEL FOR CONVERSATION REPAIR

BACKGROUND OF THE INVENTION

The present invention relates generally to the field of conversational agents, and more particularly to coordinating a conversational agent with a large language model for conversation repair.

Conversational agents (CAs), or chatbots, are gaining a wide popularity. Suggested by the name, CAs interact with people in natural languages, thereby providing customer services and companionship. Chatbots can be deployed to collect self-reports and survey responses, and to provide personalized coaching to different individuals. Traditional CAs are limited to a specific set of topics and are not able to respond to input outside those topics (i.e., they are closed domain). They can only produce responses that are pre-written or pre-approved by humans, i.e., they are non-generative.

Large language models (LLMs) are a type of artificial intelligence (AI) foundation model and are particularly well-established in natural language processing (NLP). Large language models are neural networks trained on vast amounts of human language text to achieve breakthrough results on language processing and language production tasks. Recently, large language models have greatly closed the gap between AI and humans in terms of performance. LLMs can be used to generate text for various tasks such as translation, summarization, paraphrasing, question answering, and assisted coding. LLMs can vary in size, the tasks they are pre-trained on, efficiency, and other characteristics.

SUMMARY

Embodiments of the present invention disclose a computer-implemented method, a computer program product, and a system for coordinating a conversational agent with a large language model for conversation repair. The computer-implemented method may include one or more computer processors receiving a failure indicator from a first conversational agent, wherein the failure indicator describes a failed conversation between the first conversational agent and a user. One or more computer processors retrieve a descriptive prompt associated with the first conversational agent. One or more computer processors transmit the descriptive prompt to a large language model. One or more computer processors transfer control of the failed conversation from the first conversational agent to the large language model. One or more computer processors determine the intent of the user associated with the failed conversation using the large language model. One or more computer processors determine whether the intent of the user associated with the failed conversation matches a capability of the first conversational agent. In response to determining the intent of the user associated with the failed conversation matches a capability of the first conversational agent, one or more computer processors transfer by one or more computer processors, the user back to the first conversational agent.

DETAILED DESCRIPTION

Figure 1:
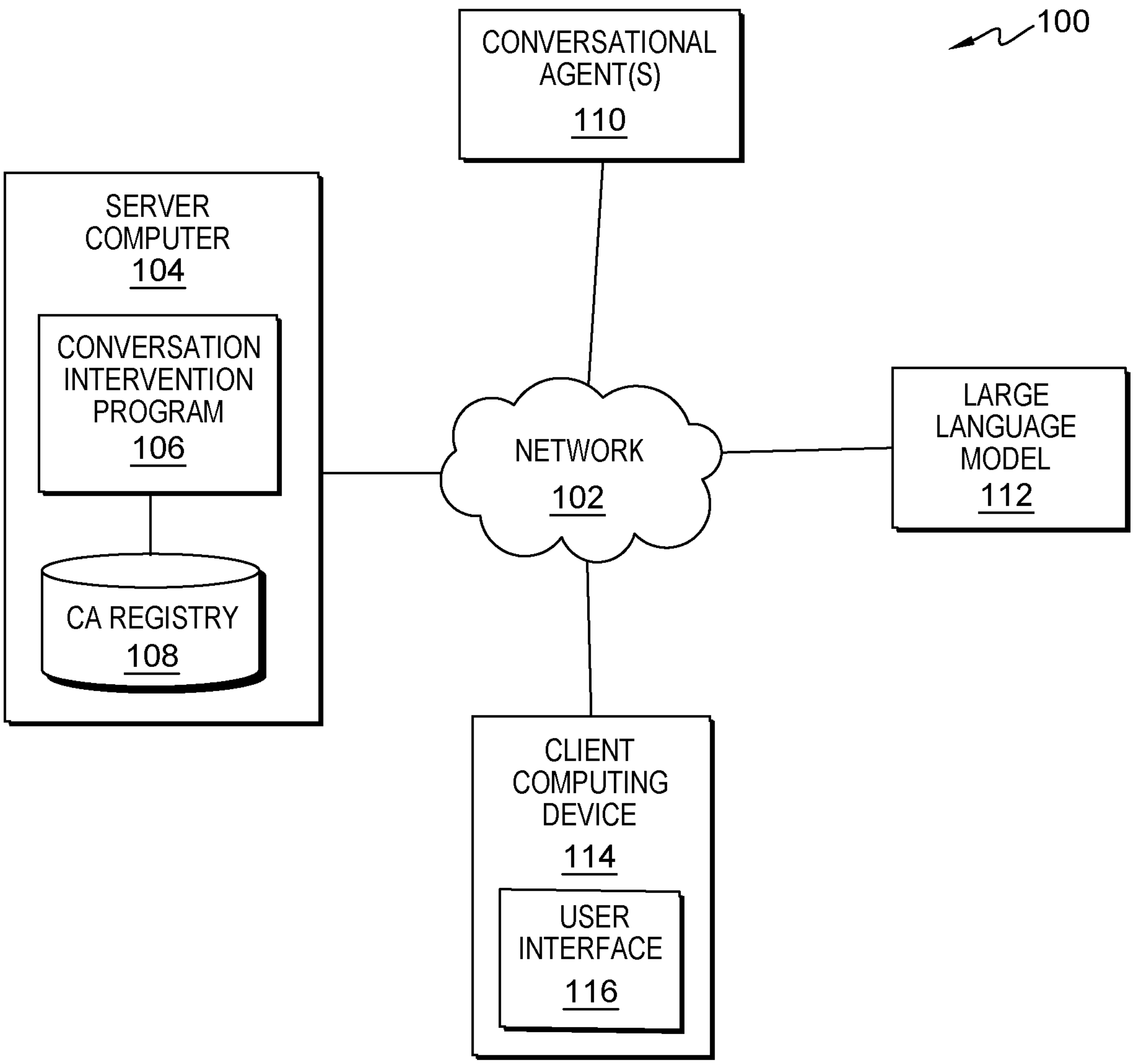
FIG. 1 is a functional block diagram illustrating a distributed data processing environment, in accordance with an embodiment of the present invention.

CAs typically have a limited scope of topics that they understand as well as responses they can produce. When faced with an uncertain utterance from a user, a CA may resort to providing suggestions that may be irrelevant or the CA may respond with an error message, such as "do not understand" or "not trained for that response," which can be frustrating for users and may lead to drop-offs or escalations to human representatives. LLMs, on the other hand, have enhanced conversational abilities as compared to CAs, but may provide responses to user requests that cannot be trusted, as current LLMs have been known to respond to requests with false and/or misleading information, often referred to as LLM hallucinations.

According to an aspect of the invention, there may be a computer-implemented method to coordinate a conversational agent with a large language model for conversation repair. The computer-implemented method may include receiving a failure indicator from a first conversational agent, where the failure indicator describes a failed conversation between the first conversational agent and a user. The computer-implemented method may also include retrieving a descriptive prompt associated with the first conversational agent. The computer-implemented method may also include transmitting the descriptive prompt to a large language model. The computer-implemented method may also include transferring, by one or more computer processors, control of the failed conversation from the first conversational agent to the large language model. The computer-implemented method may also include determining the intent of the user associated with the failed conversation using the large language model. The computer-implemented method may also include determining whether the intent of the user associated with the failed conversation matches a capability of the first conversational agent. The computer-implemented method may also include, in response to determining the intent of the user associated with the failed conversation matches a capability of the first conversational agent, transferring the user back to the first conversational agent.

The advantages of this method may include gaining efficiency by pairing one or more conversational agents (CAs) with a more linguistically capable large language model (LLM) to step in at a time where the CA fails the user, to either get the conversation back on track with the original CA or to pass the conversation on to a more suitable CA, as appropriate. The advantages of this method may also include improvement to the CA process by leveraging the conversational abilities of LLMs while preserving the security and/or safety of responses to a user and the integrity of the data passed to underlying systems, which is a province of CAs. The advantages of this method may also include improvement of coordination of multiple specialized CAs by LLM conversation-based routing between the CAs. The advantages of this method may also include a reduction in labor cost by reducing the number of users who are routed to human agents as conversational systems are better able to guide users along productive paths toward goal completion without requiring human intervention.

In embodiments, the computer-implemented method further includes passing one or more relevant details of the failed conversation to the first conversational agent. This has the advantage of enhancing and/or improving the conversation between the user and the first conversational agent.

In embodiments, the one or more relevant details of the failed conversation include at least one of a context of the failed conversation, the intent of the user, and other information relevant to the failed conversation. This information further enhances and/or improves the conversation between the user and the first conversational agent.

In embodiments, the computer-implemented method further includes, in response to determining the intent of the user associated with the failed conversation does not match the capability of the first conversational agent, transferring the user to a second conversational agent, where a capability of the second conversational agent matches the intent of the user. This process has the advantage that, when the capability/functionality of the second CA matches the intent of the user, the second CA can complete the user's request, thus satisfying the user.

In embodiments, the computer-implemented method further includes marking the first conversational agent as active. This process has the advantage of indicating which conversational agent is experiencing a failed conversation such that the large language model can be instructed to intervene on behalf of the appropriate conversational agent.

In embodiments, the computer-implemented method further includes, triggering the large language model to engage the user in a conversation. This process has the advantage of improving the determination of whether the intent of the user associated with the failed conversation matches a capability of the first conversational agent.

In embodiments, the descriptive prompt may describe a capability of the first conversational agent, a functionality of the first conversational agent, and/or a role that the large language model is to play on behalf of the first conversational agent. This has the advantage of informing the large language model of what happened in the preceding conversation with the first conversational agent that caused the conversation to fail such that the large language model can be instructed to intervene to repair the conversation.

Implementation of embodiments of the invention may take a variety of forms, and exemplary implementation details are discussed subsequently with reference to the Figures.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, conversational agent(s) 110, large language model 112, and client computing device 114, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, conversational agent(s) 110, large language model 112, client computing device 114, and other computing devices (not shown) within distributed data processing environment 100. Distributed data processing environment 100 may be implemented in computing environment 300 shown in FIG. 3.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, an edge device, a containerized workload, or any programmable electronic device capable of communicating with conversational agent(s) 110, large language model 112, client computing device 114, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes conversation intervention program 106 and conversational agent registry 108. Server computer 104 may include internal and external hardware components, as depicted and described in further detail with respect to computer 301 of FIG. 3.

When a conversational agent (CA) detects a failure in a conversation with a user, conversation intervention program 106 assists by invoking a large language model (LLM) to get the conversation back on track. Conversation intervention program 106 coordinates the two types of automated language tools, i.e., the CA and the LLM, within the same system, enabling each to perform the tasks to which they are uniquely suited. In this way, conversation intervention program 106 leverages trusted interfaces to systems of record, i.e., conventional CAs with guaranteed behavior, with the conversational abilities of LLMs without sacrificing safety/security. Conversation intervention program 106 receives a failure indicator from a first CA of conversational agent(s) 110. Conversation intervention program 106 retrieves a descriptive prompt associated with the first CA. Conversation intervention program 106 marks the first CA as active. Conversation intervention program 106 transmits the descriptive prompt to large language model (LLM) 112. Conversation intervention program 106 initiates a connection between LLM 112 and the user. Conversation intervention program 106 uses LLM 112 to determine the intent of the user conversation. Conversation intervention program 106 determines whether the intent matches the first CA, and, if so, conversation intervention program 106 transfers the user back to the first CA. If conversation intervention program 106 determines the intent does not match the first CA, then conversation intervention program 106 transfers the user to a second CA. Conversation intervention program 106 passes relevant details of the conversation to the CA. Conversation intervention program 106 is depicted and described in further detail with respect to FIG. 2.

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the user to opt-in or opt-out of participation. Similarly, in various embodiments, emails and texts begin with a written notification that the user's information may be recorded or monitored and may be saved, for the purpose of coordinating a conversational agent with a large language model for conversation repair. These embodiments may also include periodic reminders of such recording and monitoring throughout the course of any such use. Certain embodiments may also include regular (e.g., daily, weekly, monthly) reminders to the participating parties that they have consented to being recorded and monitored for coordinating a conversational agent with a large language model for conversation repair and may provide the participating parties with the opportunity to opt-out of such recording and monitoring if desired. Furthermore, to the extent that any non-participating parties' actions are monitored (for example, when outside vehicles are viewed), such monitoring takes place for the limited purpose of providing navigation assistance to a participating party, with protections in place to prevent the unauthorized use or disclosure of any data for which an individual might have a certain expectation of privacy.

In the depicted embodiment, conversational agent (CA) registry 108 resides on server computer 104. In another embodiment, CA registry 108 may reside elsewhere within distributed data processing environment 100, provided that conversation intervention program 106 has access to CA registry 108, via network 102. In an embodiment, CA registry 108 is a database, which is an organized collection of data. CA registry 108 can be implemented with any type of storage device capable of storing data and configuration files that can be accessed and utilized by conversation intervention program 106 such as a database server, a hard disk drive, or a flash memory. CA registry 108 is a collection of references to one or more CAs of conversational agent(s) 110 and tracks which CAs participate with conversation intervention program 106. In embodiments where LLM 112 is currently supporting a CA, CA registry 108 may also track which CA is active in a particular conversation with a user. CA registry 108 stores information used by and generated by conversation intervention program 106. For example, CA registry 108 stores an address of each conversational agent with which conversation intervention program 106 communicates, i.e., conversational agent(s) 110. CA registry 108 also stores a descriptive prompt associated with each of conversational agent(s) 110 that describes the capabilities and/or functionality of the individual CA as well as the role LLM 112 is to play on behalf of the CA. CA registry 108 may also store one or more transcripts of conversations between conversational agent(s) 110 and/or LLM 112 and the user. In addition, CA registry 108 may also store relevant details of conversations between conversational agent(s) 110 and/or LLM 112 and the user.

The present invention may contain various accessible data sources, such as CA registry 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Conversation intervention program 106 enables the authorized and secure processing of personal data. Conversation intervention program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Conversation intervention program 106 provides information regarding personal data and the nature (e.g., type, scope, purpose, duration, etc.) of the processing. Conversation intervention program 106 provides the user with copies of stored personal data. Conversation intervention program 106 allows the correction or completion of incorrect or incomplete personal data. Conversation intervention program 106 allows the immediate deletion of personal data.

Conversational agent(s) 110, referred to herein as CA 110, are one or more of an interactive virtual assistant, or chatbot, that communicates with a user to, for example, answer questions or provide guidance on a topic for which the CA is specifically trained. Each of CA 110 includes an associated prompt that describes the capabilities and/or functionality of the individual CA. Each of CA 110 communicates with a system of record (SoR, not shown). A SoR is typically a database supporting one or more guaranteed transactions. For example, in the travel industry, there may be a unique SoR for airline booking, hotel booking, loyalty program points redemption, local tour booking, etc. In the example, there is a unique CA of CA 110 associated with each SoR. As a result of a conversation with a user, CA 110 sends a "payload" to the associated SoR. When CA 110 sends the payload, e.g., a reservation booking, to the SoR, the payload is committed as one or more records there. As such, it is very important that the payload is well formed and correct to prevent a transaction failure. In the depicted embodiment, CA 110 resides in distributed data processing environment 100, outside of server computer 104, connected to conversation intervention program 106 via network 102. In another embodiment, CA 110 may reside on server computer 104.

Large language model (LLM) 112 is one of a plurality of foundation models that includes enhanced conversational abilities, making LLM 112 more linguistically capable than CA 110. When called upon to intervene or assist a current conversation with CA 110, LLM 112 uses one or more natural language processing (NLP) techniques to determine the intent of a conversation that a user is having with CA 110 in order to establish whether the user is interacting with the appropriate conversational agent of CA 110 and, if so, how to get the conversation back on track. In the depicted embodiment, LLM 112 resides in distributed data processing environment 100, outside of server computer 104, connected to conversation intervention program 106 via network 102. In another embodiment, LLM 112 may reside on server computer 104. In the depicted embodiment, LLM 112 is not connected to any of the systems of record associated with CA 110 which ensures that the systems of record do not contain or acquire any incorrect content due to a hallucination of LLM 112.

Client computing device 114 can be one or more of a laptop computer, a tablet computer, a smart phone, smart watch, a smart speaker, or any programmable electronic device capable of communicating with various components and devices within distributed data processing environment 100, via network 102. Client computing device 114 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, client computing device 114 may be integrated into a vehicle. For example, client computing device 114 may be a heads-up display in the windshield of the vehicle. In an embodiment where client computing device 114 is integrated into the vehicle, client computing device 114 includes a programmable, embedded Subscriber Identity Module (eSIM) card (not shown) that includes a unique identifier of the vehicle in addition to other vehicle information. In general, client computing device 114 represents one or more programmable electronic devices or combination of programmable electronic devices capable of executing machine readable program instructions and communicating with other computing devices (not shown) within distributed data processing environment 100 via a network, such as network 102. Client computing device 114 includes an instance of user interface 116.

User interface 116 provides an interface between a user of client computing device 114 and CA 110 and/or LLM 112. In one embodiment, user interface 116 is mobile application software. Mobile application software, or an "app," is a computer program designed to run on smart phones, tablet computers and other mobile devices. In one embodiment, user interface 116 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In an embodiment, user interface 116 enables a user of client computing device 114 to interact with CA 110 and/or LLM 112, i.e., make requests and receive responses.

Figure 2:
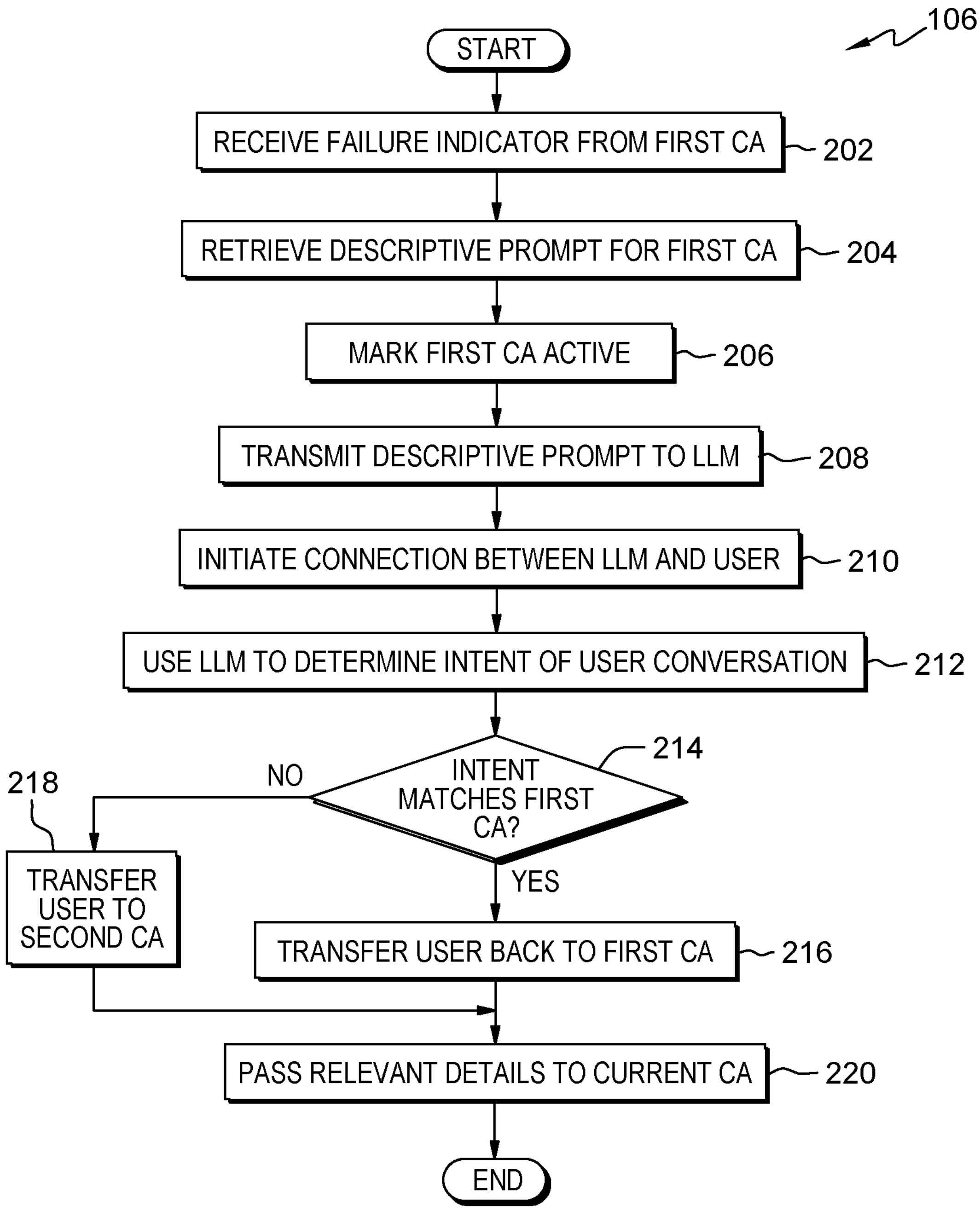
FIG. 2 is a flowchart depicting operational steps of a conversation intervention program, on a server computer within the distributed data processing environment of FIG. 1, for coordinating a conversational agent with a large language model for conversation repair, in accordance with an embodiment of the present invention.

FIG. 2 is a flowchart depicting operational steps of conversation intervention program 106, on server computer 104 within distributed data processing environment 100 of FIG. 1, for coordinating a conversational agent with a large language model for conversation repair, in accordance with an embodiment of the present invention.

Conversation intervention program 106 receives a failure indicator from a first CA of CA 110 (step 202). In an embodiment, when a first CA interacts with a user, and the user makes a request for which the first CA is not skilled to answer, the first CA detects a conversation failure and transmits a failure indicator to conversation intervention program 106. In one embodiment, the first CA stores the detected failure indicator in CA registry 108, and conversation intervention program 106 retrieves the failure indicator from CA registry 108.

Conversation intervention program 106 retrieves a descriptive prompt associated with the first CA (step 204). In an embodiment, conversation intervention program 106 determines from which CA of CA 110 the failure indicator was received and retrieves a descriptive prompt associated with that CA from CA registry 108. In an embodiment where the first CA also stored the current context of the failed conversation in CA registry 108, conversation intervention program 106 also retrieves the current context from CA registry 108. In an embodiment where the first CA stores a transcript of the failed conversation, conversation intervention program 106 may also retrieve the transcript. In another embodiment, conversation intervention program 106 receives the descriptive prompt directly, transmitted by the first CA.

Conversation intervention program 106 marks the first CA as active (step 206). In an embodiment, conversation intervention program 106 marks the first CA as active in CA registry 108. By marking the first CA active, conversation intervention program 106 indicates which CA of CA 110 is experiencing a failed conversation.

Conversation intervention program 106 transmits the descriptive prompt to LLM 112 (step 208). In an embodiment, conversation intervention program 106 transmits the descriptive prompt associated with the first CA, i.e., the CA experiencing the failed conversation with the user, to LLM 112 such that LLM 112 can determine the context of the failed conversation. In an embodiment where the first CA stores the context of the failed conversation in CA registry 108, conversation intervention program 106 may transmit the associated conversation context with the descriptive prompt to LLM 112. In an embodiment where the first CA stores the transcript of the failed conversation in CA registry 108, conversation intervention program 106 may transmit the associated transcript with the descriptive prompt to LLM 112.

Conversation intervention program 106 initiates a connection between LLM 112 and the user (step 210). In an embodiment, conversation intervention program 106 transfers control of the failed conversation from the first CA to LLM 112 such that LLM 112 can intervene in the failed conversation with the user via user interface 116. Thus, conversation intervention program 106 coordinates, or combines, trusted interfaces of systems of record, i.e., one or more conversational agents with guaranteed behaviors, with the enhanced conversational abilities, but lower trustworthiness, of LLMs, and leverages the best capabilities of both technologies.

Conversation intervention program 106 uses LLM 112 to determine the intent of the user conversation (step 212). In an embodiment, conversation intervention program 106 triggers LLM 112 to process the descriptive prompt and/or the context of the conversation and/or any stored transcript of the conversation in order to determine the intent of the user with regard to the conversation with the first CA. In an embodiment, LLM 112 uses one or more NLP techniques to analyze the descriptive prompt and/or the stored context of the conversation and/or the stored transcript of the conversation. In an embodiment, LLM 112 engages the user in a conversation to determine the intent of the user.

Conversation intervention program 106 determines whether the intent matches the first CA (decision block 214). In an embodiment, conversation intervention program 106 monitors the conversation between the user and LLM 112 and compares the intent of the user, determined using LLM 112, to the capability/functionality of the first CA, as described by the descriptive prompt, to determine if there is a match. A match indicates that the user was communicating with the correct CA and the conversation failed for a different reason. If the intent does not match the first CA, that indicates that the user is communicating with the wrong CA.

If conversation intervention program 106 determines the intent matches the first CA ("yes" branch, decision block 214), then conversation intervention program 106 transfers the user back to the first CA (step 216). In an embodiment, if conversation intervention program 106 determines the first CA has the capability/functionality to respond to the clarified request of the user, then conversation intervention program 106 re-establishes the connection between the user and the first CA such that the first CA can complete the user's request. In an embodiment, conversation intervention program 106 instructs LLM 112 to communicate to the user, via user interface 116, one or more relevant details of the failed conversation to help the user successfully complete the user's request with the first CA.

If conversation intervention program 106 determines the intent does not match the first CA ("no" branch, decision block 214), then conversation intervention program 106 transfers the user to a second CA (step 218). In an embodiment, if conversation intervention program 106 determines the first CA does not have the capability/functionality to respond to the request of the user, then conversation intervention program 106 establishes a connection between the user and a second CA of CA 110, wherein the capability/functionality of the second CA matches the intent of the user, such that the second CA can complete the user's request. In an embodiment, conversation intervention program 106 instructs LLM 112 to communicate to the user, via user interface 116, one or more relevant details of the failed conversation to help the user successfully complete the user's request with the second CA.

In an embodiment, conversation intervention program 106 instructs LLM 112 to explicitly confirm with the user that the CA to which conversation intervention program 106 is transferring the user is the correct CA for the user's intent while conversation intervention program 106 monitors the conversation between LLM 112 and the user.

In an embodiment, for example, when conversation intervention program 106 invokes LLM 112 a second time after a failed conversation with the same CA in a user session, conversation intervention program 106 augments the descriptive prompt prior to transmitting the descriptive prompt to LLM 112, as discussed with respect to step 208, wherein the augmentation includes an instruction to spend more time conversing with the user, via user interface 116, to ensure that LLM 112 accurately captures the user's intent before returning the user to a conversation with the CA.

Conversation intervention program 106 passes relevant details to the CA (step 220). In an embodiment, conversation intervention program 106 passes the relevant details of the failed conversation to the appropriate CA, i.e., either the first CA or the second CA, based on the determination of which CA capability matches the user's intent. The relevant details may include, but are not limited to, the context of the conversation with the user, the intent of the user, and/or any other information relevant to the conversation with the user that will enhance or improve the conversation between the user and the appropriate CA. In an embodiment, conversation intervention program 106 stores the relevant details of the failed conversation in CA registry 108 in association with a reference to the first and/or the second CA. In another embodiment, conversation intervention program 106 instructs LLM 112 to maintain possession of the relevant details such that conversation intervention program 106 enables LLM 112 to resume a conversation with the user where the conversation left off if conversation intervention program 106 transfers the user back to LLM 112 later in the interaction, thereby enhancing the personalization for the user.

In an embodiment, LLM 112 is the initial conversational partner with the user. In the embodiment, LLM 112 determines the user's intent with respect to the functionality of a CA and communicates the intent to conversation intervention program 106. Conversation intervention program 106 then transfers control of the conversation to the appropriate CA. The embodiment has the same advantages as the previously presented embodiment, as conversation intervention program 106 still coordinates a CA, with guaranteed behavior and interfaces to systems of record, with a LLM that has greater conversational skill but lower trustworthiness.

In an embodiment, conversation intervention program 106 stores a history of interactions with LLM 112 in CA registry 108. In an embodiment, human trainers review the details of historical interactions to create training data for LLM 112 to improve its performance over time. In another embodiment, conversation intervention program 106 automatically feeds the stored historical interactions back to LLM 112 as training data to improve its performance over time.

In an example use case of conversation intervention program 106, a user is trying to book travel reservations. The embodiment described herein uses an example of a use case in the travel industry, however, the present invention is useful in industries such as banking, healthcare, utilities, customer service, and/or any instance where a user interacts with a CA and the user provides a request which is outside the skill of the CA. In a traditional CA scenario, a user is speaking to a chatbot that only has the skill of booking airline tickets, while there are other chatbots in the travel system that can handle other types of requests. The user is booking a trip to New York and requests to book a hotel. The conversation with the traditional chatbot fails as the traditional chatbot does not understand the user's request, and the chatbot provides a default error message. In this scenario, the user can get frustrated as the user tries to clarify their out-of-scope intent to the chatbot, and eventually requests to speak to a human representative.

In a scenario where conversation intervention program 106 is present to intervene in and repair a failed conversation, the airline booking chatbot transmits a failure indicator to conversation intervention program 106, as discussed with respect to step 202. Conversation intervention program 106 transmits the descriptive prompt associated with the airline booking chatbot to LLM 112, as discussed with respect to step 208. Conversation intervention program 106 initiates a connection between LLM 112 and the user to determine the intent of the user's request, i.e., to book a hotel, as discussed with respect to steps 210 and 212. In the scenario, LLM 112 interacts with the user, via user interface 116, and may attempt to steer the conversation back toward airline reservations. For example, LLM 112 may say "It looks like you want to book a hotel. Do you want to book a flight first?" If the user responds "Sure, book a flight from Cleveland to New York on June 3," then conversation intervention program 106 determines the user intent matches the airline chatbot, as discussed with respect to the "yes" branch of decision block 214, and LLM 112 may respond with "Okay, I'm handing you back to the airline reservation chatbot. I will let it know that you want to fly from Cleveland to New York on June 3." Then conversation intervention program 106 transfers the user back to the airline booking chatbot, as discussed with respect to step 216. If, instead, the user responds "No, I want to book the hotel in New York on June 3 first," then conversation intervention program 106 determines the user intent does not match the airline chatbot, as discussed with respect to the "no" branch of decision block 214, and LLM 112 may respond with "Okay, I will hand you over to the hotel booking chatbot, and I will let it know that you want to book a hotel in New York on June 3." Then conversation intervention program 106 transfers the user to the hotel booking chatbot, as discussed with respect to step 218. In either case, conversation intervention program 106, via LLM 112, passes the relevant details, i.e., the date and location of the requested booking, to the appropriate CA, as discussed with respect to step 220.

The following three conversations further exemplify the use of conversation intervention program 106. In these conversations, "Phil" represents LLM 112 which conversation intervention program 106 calls upon when a conventional chatbot indicates a failed conversation with a user. In this scenario, the chatbot in question is designed to help a user make airline reservations. If the user insists on trying to rent a car or book a hotel, i.e., does not seem to be using the chatbot correctly, then conversation intervention program 106 transfers the conversation to Phil. Phil speaks with the user and attempts to align the conversation with the function of the chatbot. If Phil can ascertain that the user should really be speaking to another chatbot, then conversation intervention program 106 directs the user to the proper resource.

Conversation 1:

Phil: It looks like you are having trouble. What seems to be the problem?

User: I want to make a hotel reservation, but this chatbot won't let me.

Phil: Sorry for the trouble. The chatbot you are working with is only capable of making airline reservations. Do you need to reserve a flight?

User: I do.

Phil: Ok, then I will reconnect you to the chatbot, and you can tell it when and where you want to fly. Ok?

User: Yes, thanks.

Phil: Happy to be of service.

<Reconnect with airline chatbot>

Conversation 2:

Phil: It looks like you are having trouble. What seems to be the problem?

User: This hotel reservation system doesn't work!

Phil: This is an airline reservation system. Do you want to reserve a flight?

User: No! I want to reserve a hotel.

Phil: Let me connect you to the hotel reservation chatbot.

<Connect with hotel reservations chatbot>

Conversation 3:

Phil: It looks like you are having trouble. What seems to be the problem?

User: Your system won't let me make a flight reservation.

Phil: Can you describe the problem?

User: It says destination not found.

Phil: What is your destination?

User: Dizzy World

Phil: You should specify Orlando as the destination.

User: Ok, thanks.

Phil: I will now send you back to the chatbot to complete your flight reservation. Have a nice day!

<Reconnect with Airline Chatbot, Destination=Orlando>

Figure 3:
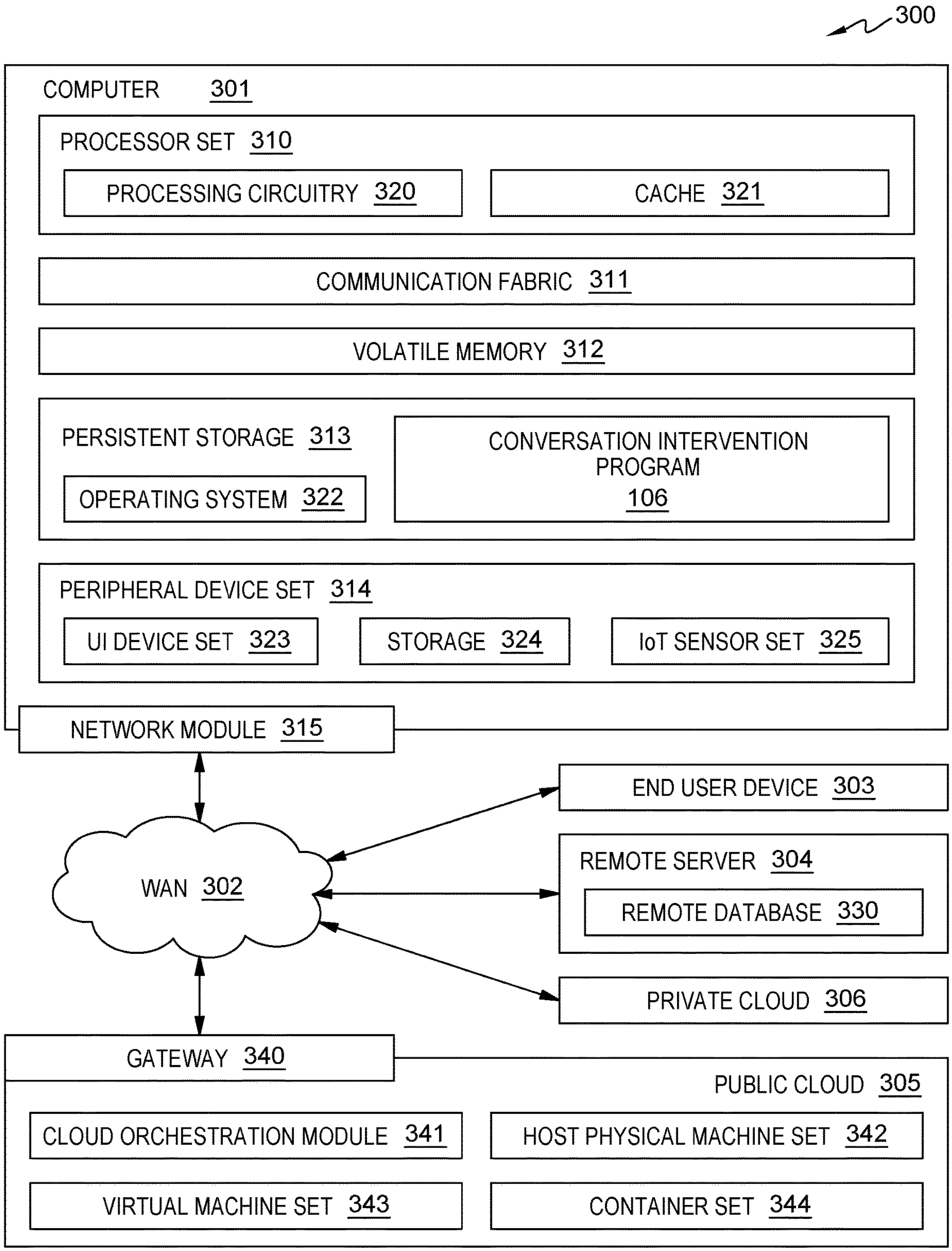
FIG. 3 illustrates an exemplary computer environment in which aspects of one or more of the illustrative embodiments may be implemented, and at least some of the computer code involved in performing the inventive methods may be executed, in accordance with an embodiment of the present invention.

FIG. 3 is an example diagram of a distributed data processing environment in which aspects of one or more of the illustrative embodiments may be implemented, and at least some of the computer code involved in performing the inventive methods may be executed, in accordance with an embodiment of the present invention, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing environment 300 contains an example of an environment for the execution of at least some of the computer code involved in performing the inventive methods, such as conversation intervention program 106 for coordinating a conversational agent with a large language model for conversation repair. In addition to conversation intervention program 106, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and conversation intervention program 106, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip."

In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in conversation intervention program 106 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid-state storage devices. Operating system 322 may take several forms, such as various known proprietary operating systems or open-source Portable Operating System Interface type operating systems that employ a kernel. The code included in conversation intervention program 106 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

receiving, by one or more computer processors, a failure indicator from a first conversational agent (CA), wherein the failure indicator describes a failed conversation between the first conversational agent and a user, and wherein the first CA is a chatbot that communicates with the user on a topic for which the first CA is specifically trained;

retrieving, by one or more computer processors, a descriptive prompt associated with the first conversational agent and a transcript of the failed conversation;

transmitting, by one or more computer processors, the descriptive prompt and the transcript to a large language model;

transferring, by one or more computer processors, control of the failed conversation from the first conversational agent to the large language model;

determining, by one or more computer processors, an intent of the user associated with the failed conversation using the large language model, wherein the large language model processes the descriptive prompt and the transcript, and also engages the user in conversation, to determine the intent of the user;

determining, by one or more computer processors, whether the intent of the user associated with the failed conversation matches a capability of the first conversational agent described in the descriptive prompt; and responsive to determining the intent of the user associated with the failed conversation matches the capability of the first conversational agent, confirming, via the large language model, with the user that the first conversational agent is correct for the intent of the user and transferring, by one or more computer processors, the user back to the first conversational agent.

2. The computer-implemented method of claim 1, further comprising:

passing, by one or more computer processors, one or more relevant details of the failed conversation to the first conversational agent.

3. The computer-implemented method of claim 2, wherein the one or more relevant details of the failed conversation include at least one of: a context of the failed conversation, the intent of the user, and other information relevant to the failed conversation.

4. The computer-implemented method of claim 1, further comprising:

responsive to determining the intent of the user associated with the failed conversation does not match the capability of the first conversational agent, transferring, by one or more computer processors, the user to a second conversational agent, wherein a capability of the second conversational agent matches the intent of the user.

5. The computer-implemented method of claim 1, further comprising:

marking, by one or more computer processors, the first conversational agent as active.

6. The computer-implemented method of claim 1, wherein the descriptive prompt describes at least one of a capability of the first conversational agent, a functionality of the first conversational agent, and a role that the large language model is to play on behalf of the first conversational agent.

7. A computer program product comprising:

one or more computer readable storage medium and program instructions stored on at least one of the one or more computer readable storage medium, the program instructions executable by a processor capable of performing a method, the method comprising:

receiving a failure indicator from a first conversational agent (CA), wherein the failure indicator describes a failed conversation between the first conversational agent and a user, and wherein the first CA is a chatbot that communicates with the user on a topic for which the first CA is specifically trained;

retrieving a descriptive prompt associated with the first conversational agent and a transcript of the failed conversation;

transmitting the descriptive prompt and the transcript to a large language model;

transferring control of the failed conversation from the first conversational agent to the large language model;

determining an intent of the user associated with the failed conversation using the large language model, wherein the large language model processes the descriptive prompt and the transcript, and also engages the user in conversation, to determine the intent of the user;

determining whether the intent of the user associated with the failed conversation matches a capability of the first conversational agent described in the descriptive prompt; and responsive to determining the intent of the user associated with the failed conversation matches the capability of the first conversational agent, confirming, via the large language model, with the user that the first conversational agent is correct for the intent of the user and transferring the user back to the first conversational agent.

8. The computer program product of claim 7, the method further comprising:

passing one or more relevant details of the failed conversation to the first conversational agent.

9. The computer program product of claim 8, wherein the one or more relevant details of the failed conversation include at least one of: a context of the failed conversation, the intent of the user, and other information relevant to the failed conversation.

10. The computer program product of claim 7, the method further comprising:

responsive to determining the intent of the user associated with the failed conversation does not match the capability of the first conversational transferring the user to a second conversational agent, wherein a capability of the second conversational agent matches the intent of the user.

11. The computer program product of claim 7, the method further comprising:

marking the first conversational agent as active.

12. The computer program product of claim 7, wherein the descriptive prompt describes at least one of a capability of the first conversational agent, a functionality of the first conversational agent, and a role that the large language model is to play on behalf of the first conversational agent.

13. A computer system comprising:

one or more processors, one or more computer readable memories, one or more computer readable storage medium, and program instructions stored on at least one of the one or more computer readable storage medium for execution by at least one of the one or more processors via at least one of the one or more memories, wherein the computer system is capable of performing a method comprising;

receiving a failure indicator from a first conversational agent (CA), wherein the failure indicator describes a failed conversation between the first conversational agent and a user, and wherein the first CA is a chatbot that communicates with the user on a topic for which the first CA is specifically trained;

retrieving a descriptive prompt associated with the first conversational agent and a transcript of the failed conversation;

transmitting the descriptive prompt and the transcript to a large language model;

transferring control of the failed conversation from the first conversational agent to the large language model;

determining an intent of the user associated with the failed conversation using the large language model, wherein the large language model processes the descriptive prompt and the transcript, and also engages the user in conversation, to determine the intent of the user;

determining whether the intent of the user associated with the failed conversation matches a capability of the first conversational agent described in the descriptive prompt; and responsive to determining the intent of the user associated with the failed conversation matches the capability of the first conversational agent, confirming, via the large language model, with the user that the first conversational agent is correct for the intent of the user and transferring the user back to the first conversational agent.

14. The computer system of claim 13, the method further comprising:

passing one or more relevant details of the failed conversation to the first conversational agent.

15. The computer system of claim 14, wherein the one or more relevant details of the failed conversation include at least one of: a context of the failed conversation, the intent of the user, and other information relevant to the failed conversation.

16. The computer system of claim 13, the method further comprising:

responsive to determining the intent of the user associated with the failed conversation does not match the capability of the first conversational agent, transferring the user to a second conversational agent, wherein a capability of the second conversational agent matches the intent of the user.

17. The computer system of claim 13, wherein the descriptive prompt describes at least one of a capability of the first conversational agent, a functionality of the first conversational agent, and a role that the large language model is to play on behalf of the first conversational agent.

* * * * *